United States Patent

Cupples et al.

[15] 3,640,852
[45] Feb. 8, 1972

[54] SEPARATION OF ALKYL BROMIDES FROM THE CORRESPONDING CARBON NUMBER ALCOHOL BY DISTILLATION WITH WATER

[72] Inventors: Barrett L. Cupples, Plum Boro; Clarence R. Murphy, Allison Park, both of Pa.

[73] Assignee: Gulf Research & Development Company, Pittsburgh, Pa.

[22] Filed: Mar. 23, 1970

[21] Appl. No.: 21,829

[52] U.S. Cl. ..................203/96, 203/39, 260/493, 260/652 P
[51] Int. Cl. ......................B01d 3/34, C07c 19/00
[58] Field of Search .....................203/95–97, 92, 203/93, 39, 76, 79, 83, 85; 260/493, 652 P

[56] References Cited

UNITED STATES PATENTS

| | | | |
|---|---|---|---|
| 2,404,800 | 7/1946 | Hirschkind | ..........................260/652 P |
| 2,977,290 | 3/1961 | Molander | ...............................203/95 |
| 3,510,500 | 5/1970 | Walsh | ....................................260/493 |

Primary Examiner—Wilbur L. Bascomb, Jr.
Attorney—Meyer Neishloss, Deane E. Keith and Richard C. Gaffney

[57] ABSTRACT

An alkyl bromide having from six to 12 carbon atoms per molecule is separated from an alkyl alcohol having the same number of carbon atoms per molecule by distillation in the presence of water.

9 Claims, 1 Drawing Figure

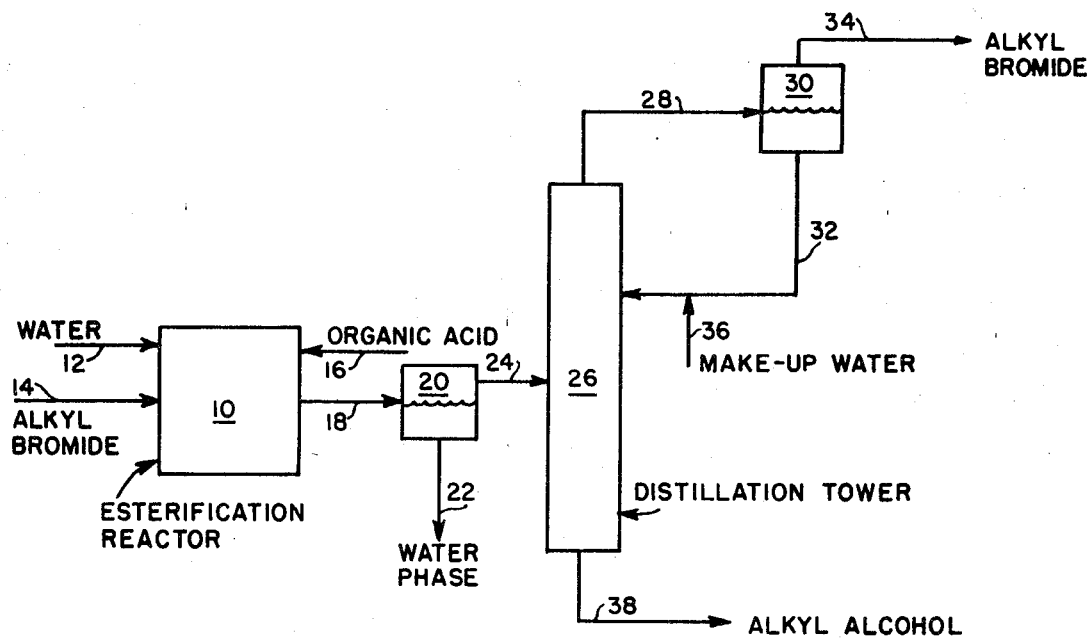
INVENTORS
BARRETT L. CUPPLES
CLARENCE R. MURPHY

SEPARATION OF ALKYL BROMIDES FROM THE CORRESPONDING CARBON NUMBER ALCOHOL BY DISTILLATION WITH WATER

This invention relates to the separation of certain alkyl bromides from a corresponding carbon number alcohol by distillation in the presence of water. In particular, this invention relates to the separation of alkyl bromides having from six to 12 carbon atoms from the corresponding carbon number alkyl alcohol by distillation of the admixture in the presence of water.

In the aqueous reaction of alkyl bromides, such as 1-bromooctane, with organic acids, such as propionic acid, to produce an ester, such as octyl propionate the reaction product contains, among other things, some unreacted alkyl bromide and some alcohol produced by the hydrolysis of the alkyl bromide. It is desirable to recycle the unreacted alkyl bromide for further esterification but undesirable to recycle the alcohol since usually it is a more valuable product in its own right than the alkyl bromide and recycling of the alcohol might tend to inhibit its further formation. The separation of the alkyl bromide having from six to 12 carbon atoms from the corresponding carbon number alkyl alcohol presents difficulties, however, because of their close boiling points. 1-Bromooctane and n-octyl alcohol, for example, form an azeotrope which boils at 130° C. at 100 mm. of mercury. Although these materials can be separated using 30 mm. of mercury vacuum, such a vacuum is too expensive for economic commercial operation.

Extraction of a mixture of octyl bromide, i.e., 1-bromooctane, and n-octyl alcohol was tried to remove the alcohol employing various solvents including triethylene glycol, glycerol and diethanolamine, but without notable success. Extractive distillation was unsuccessfully attempted to separate these same materials.

Azeotropic distillation of octyl alcohol from octyl bromide using indene gave similarly poor results.

Azeotropic distillation using water as the entraining agent was considered inoperable since water formed an azeotrope with both the alkyl bromide and the alkyl alcohol and in each case the azeotropes boiled at about the same temperature at atmospheric pressure. For example, the n-octyl bromide and n-octyl alcohol binary azeotropes with water boil at about 99° C. at atmospheric pressure. Similarly, the n-decyl bromide and n-decyl alcohol binary azeotropes with the water boil at about 99° C. at atmospheric pressure. The n-hexyl bromide and n-hexyl alcohol aqueous binary azeotropes boil at about 97° C. and 98° C. respectively at atmospheric pressure. The n-dodecyl bromide and n-dodecyl alcohol binary water azeotropes boil at about 99° C. at atmospheric pressure. Further, it was not known but it was believed possible that a ternary azeotrope might form among the bromide, alcohol and water, especially since the bromides and alcohols separately form an azeotrope. Fortuitously and for reasons which are not understood, the addition of water to a mixture of an alkyl bromide having from six to 12 carbon atoms per molecule and the corresponding carbon number alcohol allowed for the separation of these materials at reasonable pressures by distillation wherein a water-alkyl bromide azeotrope is removed as an overhead product.

This invention is based on the discovery that n-alcohols having from six to 12 carbon atoms per molecule in admixture with a correspondingly numbered n-alkyl bromide are readily separated from each other by subjecting said admixtures to distillation in the presence of water. A sufficient amount of water is employed to allow for the recovery of an n-alkyl bromide-water azeotrope as an overhead distillate fraction and the recovery of the n-alkyl alcohol as a bottoms product. The bottoms product may or may not contain water, depending on the operation of the column. On separating any water from the n-alkyl alcohol product, there is obtained an n-alkyl alcohol which contains less than about 1.0 and usually less than 0.5 weight percent of the corresponding carbon number n-alkyl bromide.

This invention is applicable to the separation of an n-alkyl bromide having from six 12 carbon atoms per molecule from a corresponding carbon number n-alkyl alcohol. Minor amounts of secondary bromides or alcohols can be present. For example, alkyl alcohols having six carbon atoms per molecule can be separated from alkyl bromides having six carbon atoms per molecule. Likewise, n-octyl bromides can be separated from n-octyl alcohol. Similarly, alkyl bromides having 10 carbon atoms per molecule, such as n-decyl bromide, can be separated from alkyl alcohols, such as n-decyl alcohol, having 10 carbon atoms per molecule.

The admixture of the bromide and alcohol can be obtained from any suitable source. For example, the reaction of alkyl bromides with organic acids is known (Canadian Pat. No. 765,833 to William L. Walsh et al.) to produce a desired ester product. The addition of water to this esterification reaction greatly improves the yield of product but, in addition, results in the hydrolysis of a portion of the alkyl bromide to the corresponding carbon number alcohol. Thus one suitable source of an alkyl bromide-alkyl alcohol admixture to be separated in accordance with the teachings of this invention is the reaction product of an alkyl bromide having from six to 12 carbon atoms per molecule with an organic acid in the presence of water. This reaction product is normally passed to a phase separator and the organic layer is distilled in the added presence of water.

The invention will be further described with reference to the sole FIGURE. An alkyl bromide having from six to 12 carbon atoms, per molecule, for example, n-octyl bromide, is passed through line 14 into esterification reactor 10. Water is added to the esterification reactor through line 12 and an organic acid, such as propionic acid, is added to esterification reactor 10 through line 16. The esterification reaction occurs in reactor 10 under suitable conditions such as a temperature from about 170° C. to 250° C., a pressure of 100 to 400 p.s.i.g., a reaction time of 1 minute to 4 hours and a molar ratio of water to alkyl bromide to organic acid of from about 25:1:1 to about 150:1:10. The product is removed through line 18 into phase separator 20. A water phase is removed through line 22 for further treatment. The organic phase is removed through line 24 and is passed into distillation tower 26. The organic phase typically may contain from 10 to 50 weight percent of an alkyl alcohol having the same number of carbon atoms corresponding to the alkyl bromide charged to esterification reactor 10; from 1 to 50 weight percent of unreacted alkyl bromide; from 20 to 60 weight percent of the ester product resulting from the reaction of the alkyl bromide with the organic acid in reactor 10 and from 10 to 30 weight percent of unreacted organic acid. Minor amounts of water, olefins having the same number of carbon atoms as the alkyl portion of the alkyl bromide charged to reactor 10 and ethers having twice as many carbon atoms as the alkyl portion of the alkyl bromide charged to reactor 10 are also included in the organic phase charged to distillation tower 26 through line 24. The distillation tower 26 contains usually from 25 to 50 theoretical plates and the charge enters about the middle of the distillation column 26. Sufficient heat is applied to the distillation tower 26 to vaporize the liquid contents and the vapors pass upwardly and out of the column through line 28 into condenser-separator 30. The aqueous layer is removed from separator 30 through line 32 and is recycled to about the center of distillation tower 26. The organic layer is removed through separator 30 by line 34 and contains the alkyl bromide substantially free of the corresponding carbon number alkyl alcohol. The organic layer removed through line 34 may also contain the olefins produced in reactor 10 and some of the unreacted organic acid. These materials can be removed from the alkyl bromide by additional distillation if desired.

Makeup water can be added to distillation tower 26 through line 36. The reflux ratio is normally total. In the case of separation of octyl bromide from octyl alcohol, the mole percent water and the overhead fraction is from about 93 to 96 mole percent.

A bottoms fraction is removed from distillation tower 26 through line 38 and comprises the alkyl alcohol substantially free of the alkyl bromide. The ester product and most of the unreacted organic acid are also present in this bottoms fraction, and each of these components can be separated by additional conventional fractionation columns (not shown).

It is essential in the azeotropic distillation refining method of this invention that the presence of water be maintained during the operation and this water should be present in an amount sufficient to sustain the continuous removal of an overhead alkyl bromide-water binary azeotrope and the removal of an alkyl alcohol bottoms product. The minimum amount of water that may be employed is about 1 percent by volume. The maximum volume of water that may be added to the charge is limited only by practical considerations. However, for the average crude normal alkyl bromide product mixture that contains a corresponding carbon number alkyl alcohol, it is preferred to use between about 10 percent and 50 percent by volume of water based on the volume of organic charge.

The relative efficiency of the refining distillation will depend on the type of rectifying column employed and on the respective reflux ratios of distillate fractions. Suitably a rectifying column equivalent to at least about 10 theoretical plates, and preferably about 25 to 50 theoretical plates, is employed for satisfactory results. The particular reflux ratio used for collecting the overhead alkyl bromide distillate fraction will vary in a manner depending on the efficiency of the rectifying column, the kind of material being collected and the purity desired. For example, if crude n-octyl bromide containing some isomeric octyl bromides, some n-octyl alcohol and other components mentioned above is being distilled through a 30-theoretical-plate column, then the refined octyl bromide fraction should not reflux at a ratio lower than 1.5:1 in order to obtain a refined n-octyl bromide of 10 percent n-octanol content; and if the reflux ratio is increased, then n-octyl bromide of a lower percent n-octanol content can be recovered.

The invention will be further described with reference to the following experimental work.

A feed stock having the composition shown in Table I below was preheated to 25° C. and was introduced at the rate of 100 c.c. per hour onto the 14th theoretical plate from the bottom of a column containing a total of about 33 theoretical plates. Both organics and water were refluxed to the column at a ratio of 1.5:1. Water containing about 9.1 weight percent propionic acid was separated from the two-phase overhead and was totally recycled to the column on the same theoretical plate with the organic feed mixture. The amount of water present in the column was about 94 mole percent based on the octyl bromide-octyl alcohol mixture in the feed. The separated overhead organic phase, which came off at a rate about one-third that of the propionic acid-water, was withdrawn. A bottoms stream was continuously withdrawn from the pot in which a water phase was maintained. Because water prevented the column or pot temperatures from rising above 100° C. at atmospheric pressure, the distillation was possible without fear of n-octyl bromide decomposition.

Typical stream compositions for the overhead and bottoms organic fractions are also shown in Table I below.

Table I

| Stream Composition: Wt. % With Water in the Pot | | | |
|---|---|---|---|
| | Feed | OVHD | BTMS |
| Propionic Acid | 18.9 | 7.0 | 19.2 |
| Octene | 7.8 | 21.3 | — |
| 2-Octanol | 0.5 | 1.5 | — |
| 1-Octanol | 14.9 | 9.1 | 17.2 |
| 2Octyl Bromide | — | 0.8 | — |
| 1-Octyl Bromide | 20.6 | 56.2 | 0.4 |
| 2-Octyl Propionate | 0.3 | 0.4 | 0.5 |
| 1-Octyl Propionate | 35.2 | 3.7 | 59.7 |
| Dioctylether | 1.8 | — | 3.0 |
| TOTAL | 100.0 | 100.0 | 100.0 |
| 1-Octanol Recovery: % | — | 24.1 | 75.9 |
| 1-Octyl Bromide Recovery: % | — | 98.7 | 1.3 |
| 1-Octanol/1-Octyl Bromide | 0.725 | 0.161 | 38.2 |
| 1-Octanol Reacted: % | | 5.4 | |
| Amount of Water in Column: Mol. % | | 95.9 | |

Recovery of the octyl bromide in the overhead stream was 98.7 percent, and 75.9 percent of the octyl alcohol was recovered in the bottoms. For a given size column, the percent alcohol recovered in the bottom will increase as the percent alkyl bromide in the charge decreases.

Referring to Table I, it can be seen that a bottoms octyl alcohol fraction containing less than 1 percent octyl bromide was obtained. The overhead fraction still contained 9.1 weight percent octyl alcohol but this could have been reduced with the use of a column having a greater number of theoretical plates.

In the above experiment for Example 1, the still pot was about one-half full of water. Above 5 percent of the octyl alcohol reacted with the organic acid to form ester. When Example 1 was repeated except the still pot (but not the column) was run dry, 46.5 percent of the octyl alcohol reacted with the propionic acid to form an ester. Thus more or less ester and/or alcohol can be produced in the product depending on whether the still pot to the distillation column is run dry or in the presence of a substantial amount of water.

EXAMPLE 2

Example 1 was repeated except a mixture of n-decyl alcohol and n-decyl bromide having the composition shown in Table II below was distilled in a column containing 24 theoretical plates. The composition of the organic overhead and bottoms fractions are also shown in Table II.

TABLE II

| Stream Composition: Wt. %* | | | |
|---|---|---|---|
| | Feed | Overhead | Bottoms |
| n-Decanol | 25.7 | 17.3 | 25.1 |
| n-Decyl Bromide | 21.6 | 69.7 | 12.4 |
| Ester (Decylpropionate) | 52.7 | 13.0 | 62.5 |
| Total | 100.0 | 100.0 | 100.0 |

*Propionic Acid Free Basis

An improved separation would, of course, result if the column were operated under more efficient conditions. The data in Table II illustrate a separation is possible.

Resort may be had to such variations and modifications as fall within the spirit of the invention and the scope of the appended claims.

We claim:

1. A method of separating a mixture comprising an alkyl bromide having from six to 12 carbon atoms per molecule and an alkyl alcohol corresponding to said alkyl bromide which comprises distilling said mixture in the presence of water and recovering a n-alkyl bromide-water azeotrope overhead and a separate alkyl alcohol product containing less than about 1 mole percent alkyl bromide.

2. A method according to claim 1 wherein the amount of water in the overhead fraction is from 93 to 96 mole percent.

3. A method according to claim 1 wherein the pressure is about atmospheric.

4. A method of purifying crude alkyl alcohol having from six to 12 carbon atoms and containing more than about 1 mole percent of a corresponding carbon number alkyl bromide which comprises distilling said crude alkyl alcohol in the presence of about 10 to 50 percent by volume of Water, based on the volume of organic charge added as an entraining agent and recovering a separate alkyl alcohol product containing less than about 1 mole percent alkyl bromide.

5. A method according to claim 4 wherein the alkyl alcohol is octyl alcohol and the alkyl bromide is octyl bromide.

6. A method according to claim 4 wherein the alkyl alcohol is decyl alcohol and the alkyl bromide is decyl bromide.

7. A method according to claim 4 wherein the crude alkyl alcohol contains about 10 to 50 weight percent alkyl alcohol and about 1 to 50 weight percent alkyl bromide.

8. A method according to claim 7 wherein the crude alkyl alcohol is a fraction of a product obtained by the aqueous esterification of an alkyl bromide with an organic acid.

9. A method according to claim 8 wherein the crude alkyl alcohol is obtained by the esterification of octyl bromide with propionic acid.

* * * * *